April 21, 1970     H. J. MANN, JR     3,507,035
TUBING CUTTER
Filed June 13, 1968     2 Sheets-Sheet 1
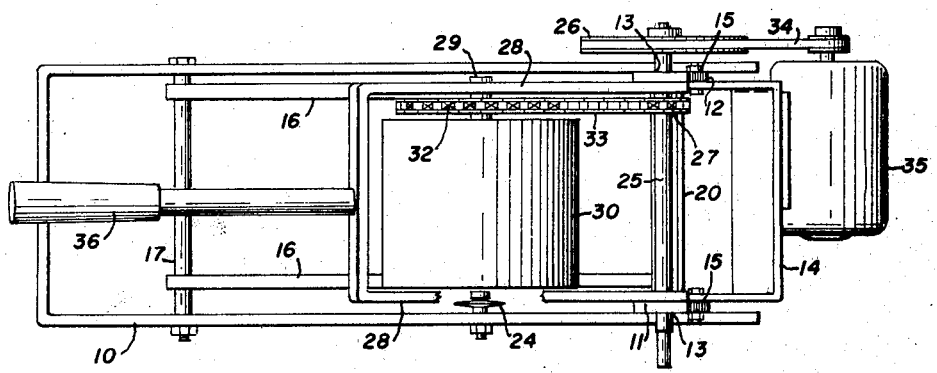
FIG. 1.
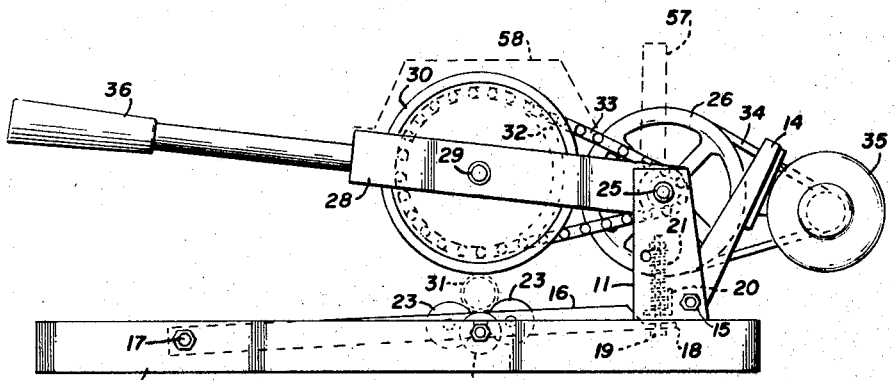
FIG. 2.
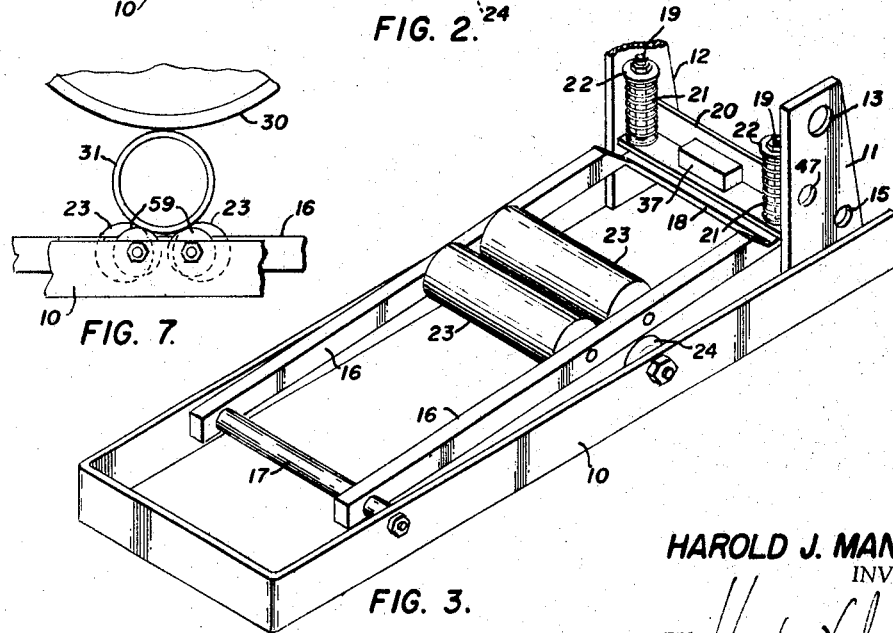
FIG. 7.
FIG. 3.
HAROLD J. MANN, JR.
INVENTOR.
BY
ATTORNEY April 21, 1970    H. J. MANN, JR    3,507,035
TUBING CUTTER Filed June 13, 1968    2 Sheets-Sheet 2

HAROLD J. MANN, JR.
INVENTOR.

BY

ATTORNEY

United States Patent Office 3,507,035
Patented Apr. 21, 1970

3,507,035
TUBING CUTTER
Harold J. Mann, Jr., 4424 E. Lancaster,
Fort Worth, Tex. 76103
Filed June 13, 1968, Ser. No. 736,759
Int. Cl. B23b 5/16; B26d 3/16
U.S. Cl. 29—564                         4 Claims

ABSTRACT OF THE DISCLOSURE

A portable power driven tubing cutter using a manually pressured roller to frictionally rotate the tubing against a cutting wheel, and including automatic de-burring and polishing of the cut ends of the tubing.

---

This invention relates to tubing cutters of the type used by plumbers and electricians for cutting thin walled tubing such as copper water pipe and electrical conduit and is an improvement on my prior Patent No. 3,302,285, issued Feb. 7, 1967.

One purpose of the invention is to provide an electrically powered tubing cutter which is sufficiently compact and lightweight to be portable to where the installation is being made.

Another object of the invention is to provide a tubing cutter in which the tubing is automatically aligned perpendicular to the cutting wheel avoiding any mistracking or "screw threading" and whereby the cutting operation is accomplished by a single rotary motion without the use of compression screws.

Another object of the invention is to provide a tubing cutter of the described type which can include simultaneous cleaning and de-burring of the outside of the cut ends of the tubing and provides means whereby internal burrs and scale can also be removed.

These and other objects will become apparent from the following description and the accompanying drawing, in which:

FIGURE 1 is a plan view of the invention with part of the frame cut away to show the cutting wheel;

FIGURE 2 is a side elevation of the invention;

FIGURE 3 is an isometric view of the base portion of the machine showing the cradle rollers and the cutting wheel;

FIGURE 7 is a fragmentary elevational view showing optional paired cutting wheels.

Figure 4:
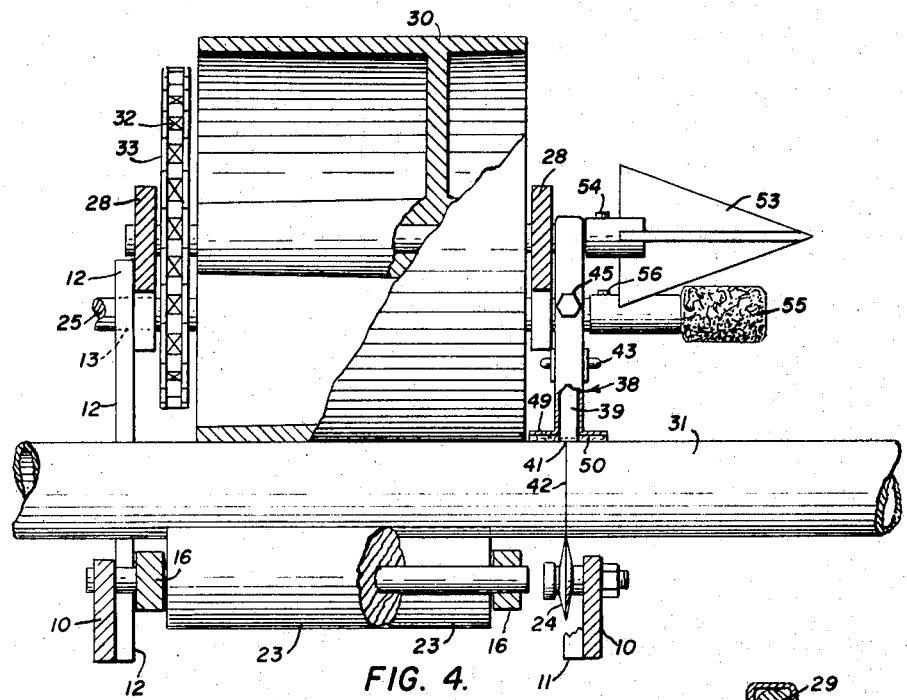
FIGURE 4 is a vertical cross sectional view along the line of the tubing shown during the cutting operation.

The form of the invention herein illustrated consists of a U-shaped base frame 10 of fairly substantial material, bearing a pair of uprights 11 and 12 with journals 13 near the top. A pivoting motor bracket 14 is bolted to the uprights 11 and 12 at holes 15. A subframe 16 is attached at one end to the base frame 10 by means of a shaft 17 and has at its opposite end a flattened cross member 18 drilled to accept a pair of vertical tension bolts 19. An angle frame 20 is fixed between the uprights 11 and 12 just above the cross member 18 and is drilled to slidably receive the tension bolts 19. Compression springs 21 retained by washers 22 on the tension bolts 19 tend to hold the subframe 16 in the raised position shown in FIGURES 2 and 3.

A pair of rollers 23 are journaled within the subframe 16 to form a cradle to hold the piece of tubing to be cut, and a cutting wheel 24 is bolted to the base frame 10 with its axis parallel to and aligned between the axes of the rollers 23.

A drive shaft 25 extends through the journals 13 and carries a V-pulley 26 and a small sprocket 27. A U-shaped pressure frame 28 is also journaled to the drive shaft 25 and carries a rotating shaft 29 located parallel to the rollers 23 and directly above them. The rotating shaft 29 carries a large diameter drive roller 30 which bears on the tubing 31 when the machine is in use. The driving roller 30 is powered by a large sprocket 32 and a chain 33 running from the small sprocket 27 which, in turn, is driven by the V-pulley 26 and a belt 34 running from a motor 35 mounted on the bracket 14. A handle 36 extends from the pressure frame 28 and is used during the cutting operation to give added leverage and hence increased pressure on the cutting wheel 24.

In operation, the pressure frame 28 carrying the drive roller 30 is raised sufficiently to allow the tubing 31 to be placed on the cradle rollers 23. Pressure is then applied to the handle 36, depressing the subframe 16 against the compression springs 21 and thus allowing the cutting wheel 24 to cut into the tubing 31 while the latter is firmly clamped between the cradle rollers 23 and the drive roller 30 and is being rotated by said drive roller.

A normally closed switch 37 may be mounted on the angle frame 20 with a plunger (not shown) extending through the latter towards the cross member 18 on the subframe 16, and held open by the pressure of the springs 21. As soon as the subframe 16 is depressed to start the cutting operation, the switch 37 is closed and the motor 35 is turned on, and when the handle 36 is released at the end of the cutting operation the rising subframe 16 will turn off the switch 37.

Figure 5:
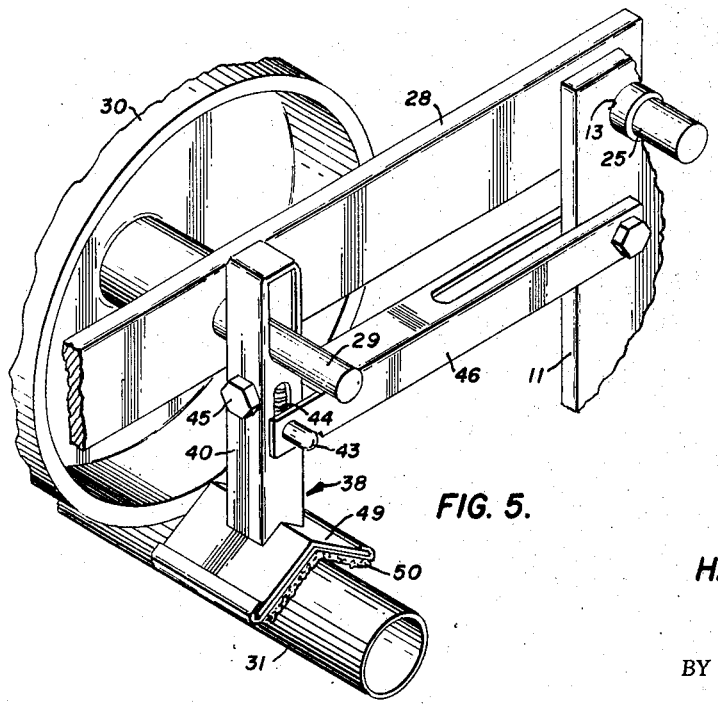
FIGURE 5 is an isometric view of the de-burring attachment in place on the machine.
Figure 6:
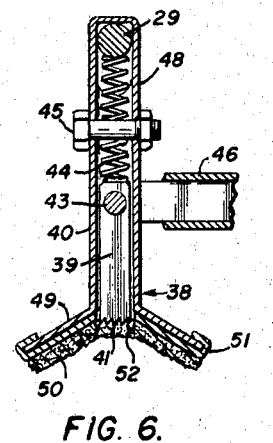
FIGURE 6 is a vertical sectional view of the de-burring attachment.

A de-burring attachment 38 is included in the form of the invention herein illustrated (FIGURES 4, 5 and 6) which comprises a spring loaded plunger 39 in an elongate vertical casing 40 slotted to fit over the end of the rotating shaft 29 directly over the cutting wheel 24. The lower end of the plunger 39 is provided with scrapers 41 running transversely of the cut line 42 on the tubing 31. A pin 43 holds the plunger 39 in place against a spring 44 bearing against a bolt 45 and also serves as a pivotal connection to an arm 46 mounted pivotally on the upright 11 at the hole 47 shown in FIGURE 3.

A second spring 48 is compressed between the bolt 45 and the rotating shaft 29 so that a downward pressure is exerted on the vertical casing 40 and thence to the plunger 39 during the cutting operation. Wings 49 at the bottom of the vertical casing 40 are covered with an abrasive impregnated plastic or metal wool 50 which polishes the cut ends of the tubing during rotation, preparing same for soldering. In the construction shown the wool 50 is attached to a clip 51 which slides over the wings 49 and is held in place by the plunger 39 projecting through a square center hole 52. As shown only in FIGURE 4, a reamer 53 attached to the rotating shaft 29 by means of a setscrew 54 can be used to remove burrs from the inside of the tubing cut and a polisher 55 made from abrasive wool and attached to the drive shaft 25 by a setscrew 56 can be used for removing scale and impurities from inside of the cut ends of the tubing.

A handle 57, shown by dotted lines in FIGURE 2, may be located above the center of gravity of the machine for convenience in carrying, and a cover 58 also shown by dotted lines, may be included to keep dirt and grease, which might impair its operation, off of the drive roller 30. In a heavier version of the cutting machine paired cutting wheels 59 shown mounted in line on the frame 10 in FIGURE 7, may be used to increase the cutting efficiency.

The invention is not limited to the exemplary constructions herein shown and described, but may be made in various ways within the scope of the appended claims.

What is claimed is:
1. A tubing cutter comprising a generally rectangular base frame, uprights extending from the side members at one end of said base frame, a sub-frame pivotally attached at the opposite end of said base frame and lying therewithin, cradle rollers transversely journaled within said sub-frame midway its ends, spring means supporting the free end of said sub-frame, at least one cutting wheel attached to said main frame with its axis parallel to and equidistant from and normally below the axes of said cradle rollers, a large diameter drive roller journaled to a pressure frame pivotally connected to said uprights, said drive roller being parallel to and superimposed above said cradle rollers, and power means turning said drive roller.

2. A tubing cutter as defined in claim 1 and wherein the pivotal connection between the said pressure frame and the said uprights comprises a drive shaft, a driving sprocket on said drive shaft, a driven sprocket attached to said driving roller, chain connecting said sprockets, and electric motor means turning said drive shaft.

3. A tubing cutter as defined in claim 1 and having a scraper superimposed above said cutting wheel and spring means forcing said scraper against the tubing being cut when said pressure frame is depressed.

4. A tubing cutter as defined in claim 1 and having a tapered reamer rotating on the axis of said drive roller and an abrasive internal polisher rotating on the axis of said drive shaft.

References Cited

UNITED STATES PATENTS

| 3,146,526 | 9/1964 | Bollin | 29—564 |
| 3,302,285 | 2/1967 | Mann | 30—92 X |

ANDREW R. JUHASZ, Primary Examiner

Z. R. BILINSKY, Assistant Examiner

U.S. Cl. X.R.

30—92; 82—101